Feb. 23, 1937.  M. P. LAURENT  2,071,637

SLIP

Filed June 17, 1935  6 Sheets-Sheet 1

Milton P. Laurent
Inventor

Jesse R. Stone
&
Lister B. Clark

Attorneys

Milton P. Laurent, Inventor

Feb. 23, 1937.  M. P. LAURENT  2,071,637

SLIP

Filed June 17, 1935  6 Sheets-Sheet 5

Milton P. Laurent Inventor

Feb. 23, 1937.  M. P. LAURENT  2,071,637

SLIP

Filed June 17, 1935  6 Sheets-Sheet 6

Milton P. Laurent, Inventor

By Jesse R. Stone & Lester B. Clark, Attorneys

Patented Feb. 23, 1937

2,071,637

UNITED STATES PATENT OFFICE 2,071,637

SLIP

Milton P. Laurent, Houston, Tex., assignor to W-K-M Company, Houston, Tex., a corporation Application June 17, 1935, Serial No. 26,999

19 Claims. (Cl. 24—263)

My invention relates to pipe-engaging slips and has particular relation to slips employed in handling pipe in wells.

In handling pipe in deep wells, such as are now commonly drilled in this country, it is necessary that the slip engage the pipe in such manner as to effectively sustain a heavy load due to the weight of the pipe and prevent its dropping in the well. Also, in handling slips of this character, it is necessary that the slips be operated uniformly so that the grip of the slips upon the pipe may take place simultaneously upon all sides and injury to the pipe may be avoided.

It is an object of the invention to provide pipe-engaging means of this character in which there are a plurality of slips, each one of which is elongated and faced in such manner as to engage the pipe for a material distance along the surface so as to obtain a firm grip thereon.

It is also an object of the invention to provide a removable gripping surface for the jaws of the slip which is easily replaceable when worn.

I further desire to construct the removable gripping surface upon the jaws of separate pieces, making it more easily manufactured and assembled.

It is also an object of the invention to provide operating means for each of the slip jaws which will move all the jaws simultaneously and to the same extent so that the movement of the jaw will be uniform and a smooth and even grip of the jaws upon the pipe will be assured.

It is a further object of the invention to provide means for controlling the operation of the jaws which can easily be operated whenever desired.

I also have as an object to so mount the slips relative to the supporting bushing that the movement of the slips inwardly toward the pipe will be a smooth wedging action, which is easily accommodated to different sizes of pipe.

The invention also resides in the general construction of the slips and the holder or bushing in which they are mounted, making it possible for the device to be easily assembled in position for operation.

Referring to the drawings herewith, Fig. 1 is a top plan view partly in section on the plane 1—1 of Fig. 3.

Fig. 9 is a transverse section on the plane 9—9 of Fig. 7.

Figure 1:
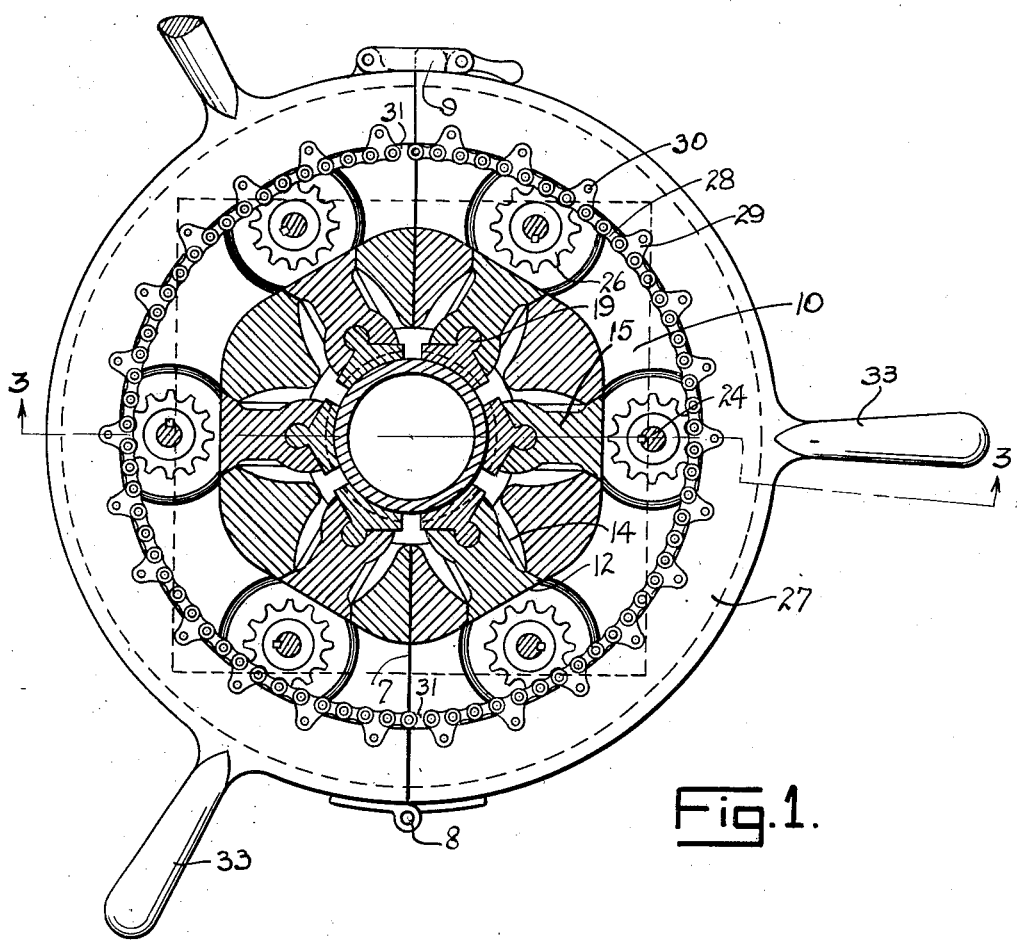

My invention is adapted for use particularly with pipe engaging slips for heavy work such as in drilling operations but it is also adapted for use in handling tubing or other lighter pipe as will be obvious.

In the drawings herewith the device is shown particularly as adapted for heavy operations. The device is to be employed as are other slip assemblies for use upon a rotary table, which is shown at 1 in Fig. 1. The construction of the usual rotary is well understood and need not be further shown or described.

Centrally of the rotary table is a squared opening 2 within which a bushing or adapter 3 is placed. The said adapter has its lower portion squared at 4 to fit within the squared opening 2. For purposes of lightness of construction the sides of the adapter are hollowed out at spaced intervals as shown at 5. The lower end of the adapter has a downwardly flared flange 6 projecting slightly below the rotary table.

The upper end of the bushing is extended laterally and is made circular as shown particularly in Fig. 1.

The adapter is made of two sections, the bushing being divided diametrically as shown at 7 in Fig. 1. At one side of the division line is a hinge 8 which allows the two sections to swing apart at the opposite side which is provided with a latch member 9.

The circular portion forming the upper end of the adapter is slotted inwardly on a plane with its upper and lower sides, as shown at 10 in Fig. 1. The wall of this slot may be extended so as to partially enclose an inner chamber 11 in which is housed the operating means.

Figure 2:
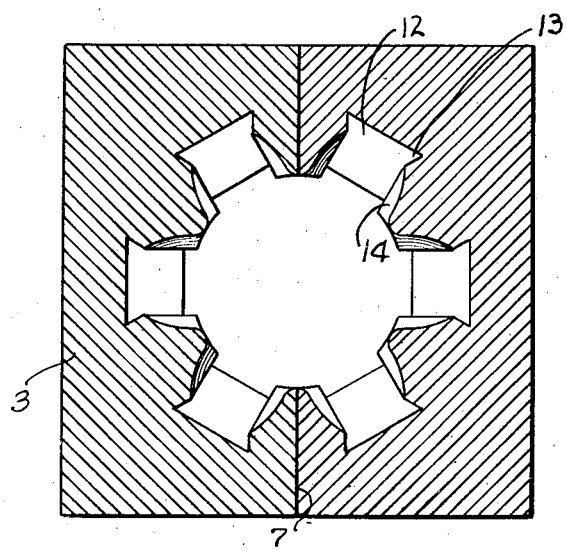
Fig. 2 is a transverse section through the supporting bushing for the slips taken approximately on the plane 2—2 of Fig. 3.

The inner wall of the bushing is formed with a series of downwardly inclined recesses 12 shown best in Fig. 2. The outer face of each recess is a smooth downwardly inclined surface upon which a jaw may slide. The recess is dovetailed or mortised, as shown at 13, so as to retain the slip within its seat and prevent its dropping into the hole. On the inner open portion of the recess the wall is rounded out at 14 to allow space in which the jaw may move.

Figure 4:
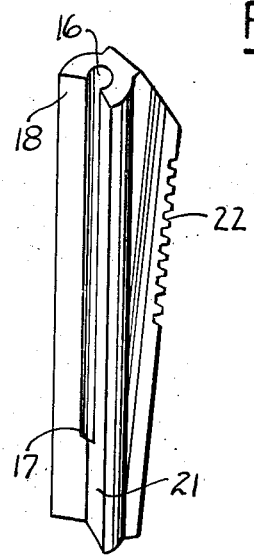
Fig. 4 is a perspective view of one of the slips with the gripping face removed.

The slips which fit within the dovetailed recess 13 just described are constructed as shown in Fig. 4. Each jaw has an outer wedge-shaped portion 15 which fits within the recess 12 and has a bearing against the downwardly inclined surface thereof whereby its downward movement will wedge it inwardly toward the pipe. The inner face of each jaw is provided with a recess 16 which is rounded on a cylindrical surface and extends from the upper end downwardly to a point 17 spaced slightly from the lower end of the slip. The walls 18 on each side of the recess are diverged away from the recess as will be understood from Fig. 4.

Figure 3:
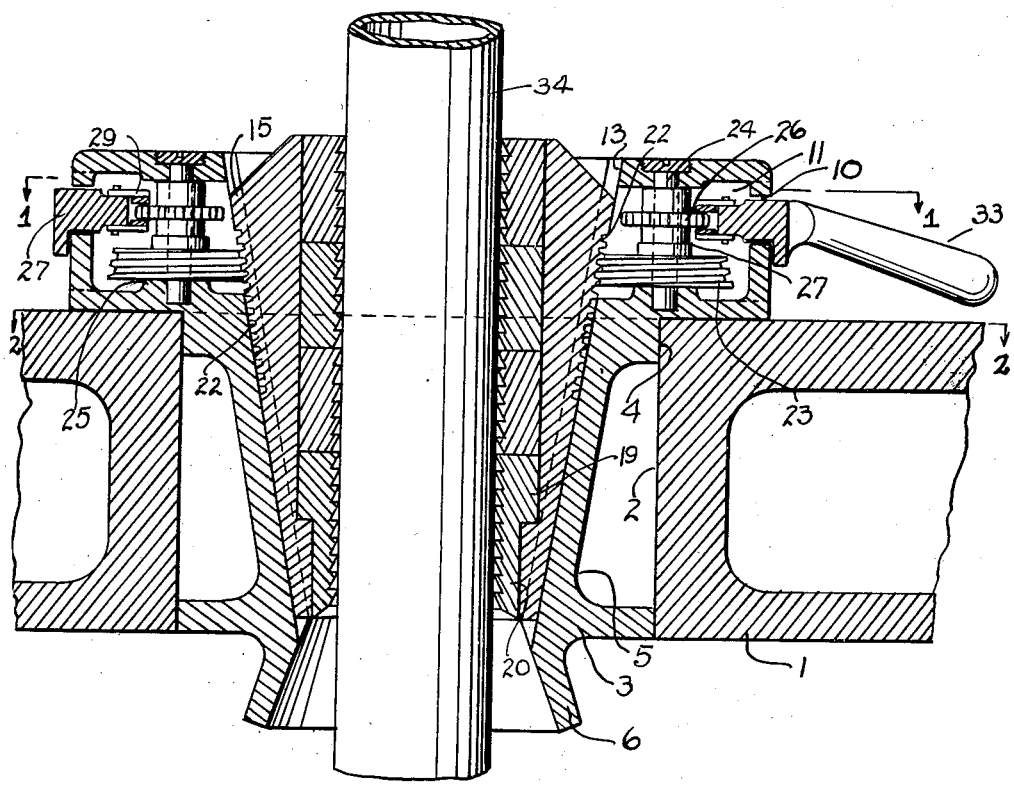
Fig. 3 is a central vertical section through my improved slips and their operating means.
Figure 5:
Fig. 5 is a perspective view of one of the jaw sections adapted to be inserted within the slip.
Figure 6:
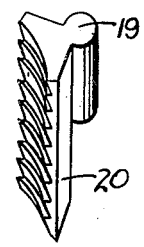
Fig. 6 is a similar view showing the lowermost of the gripping jaws.
Figure 7:
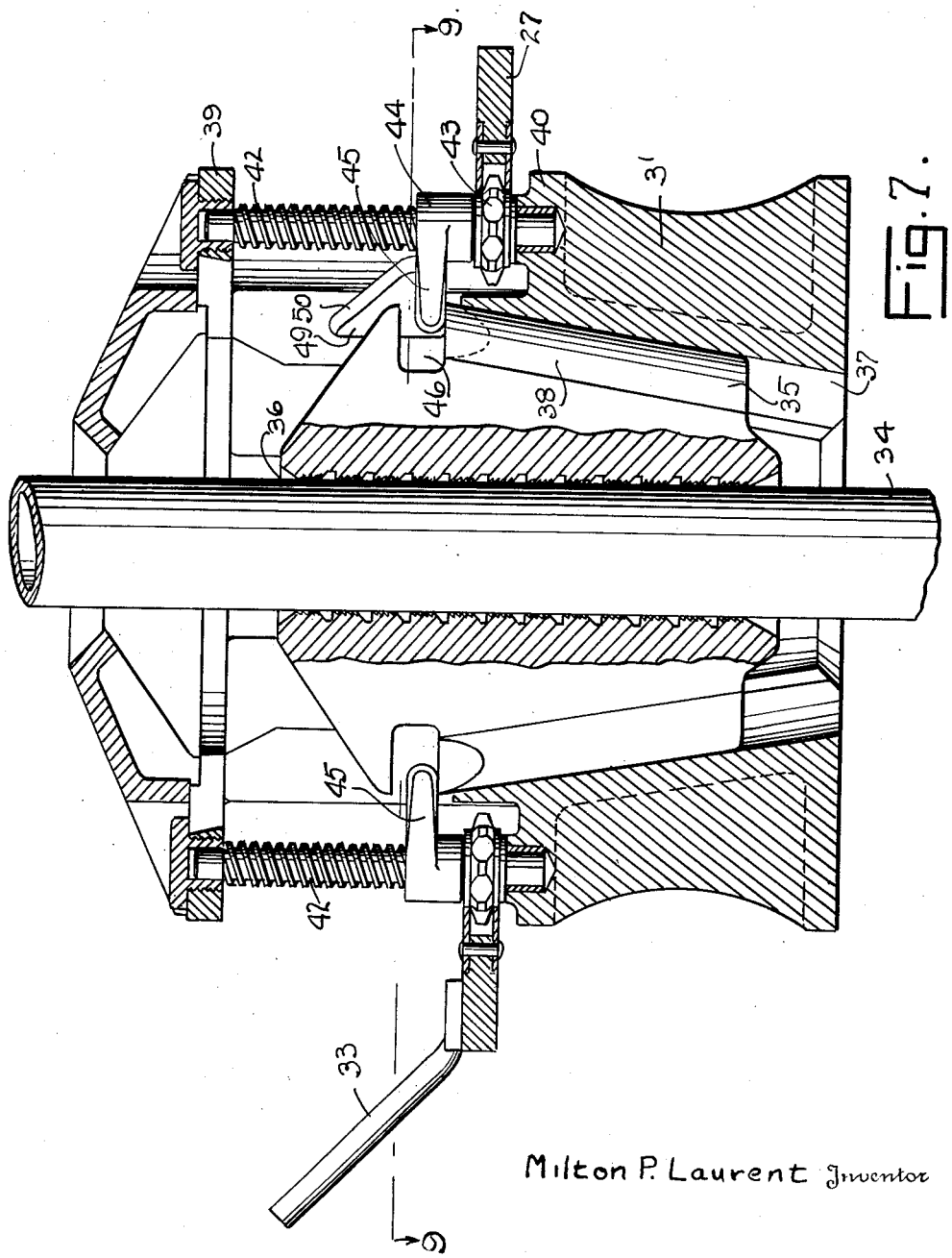
Fig. 7 is a central vertical section through an assembly illustrating a different embodiment of the invention, such section being on the plane 7—7 of Fig. 9.
Figure 8:
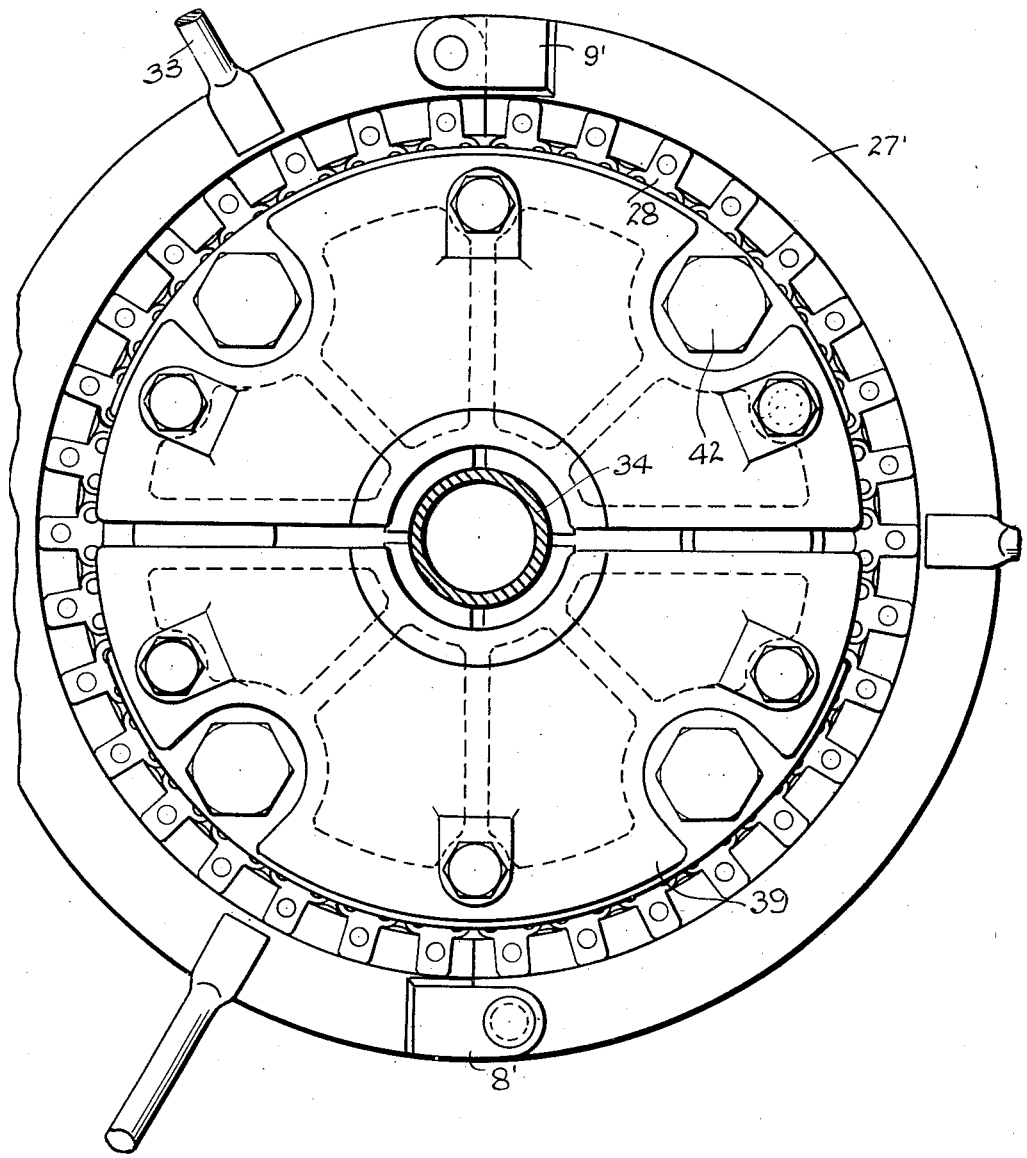
Fig. 8 is a top plan view of the device shown in Fig. 7.
Figure 3:
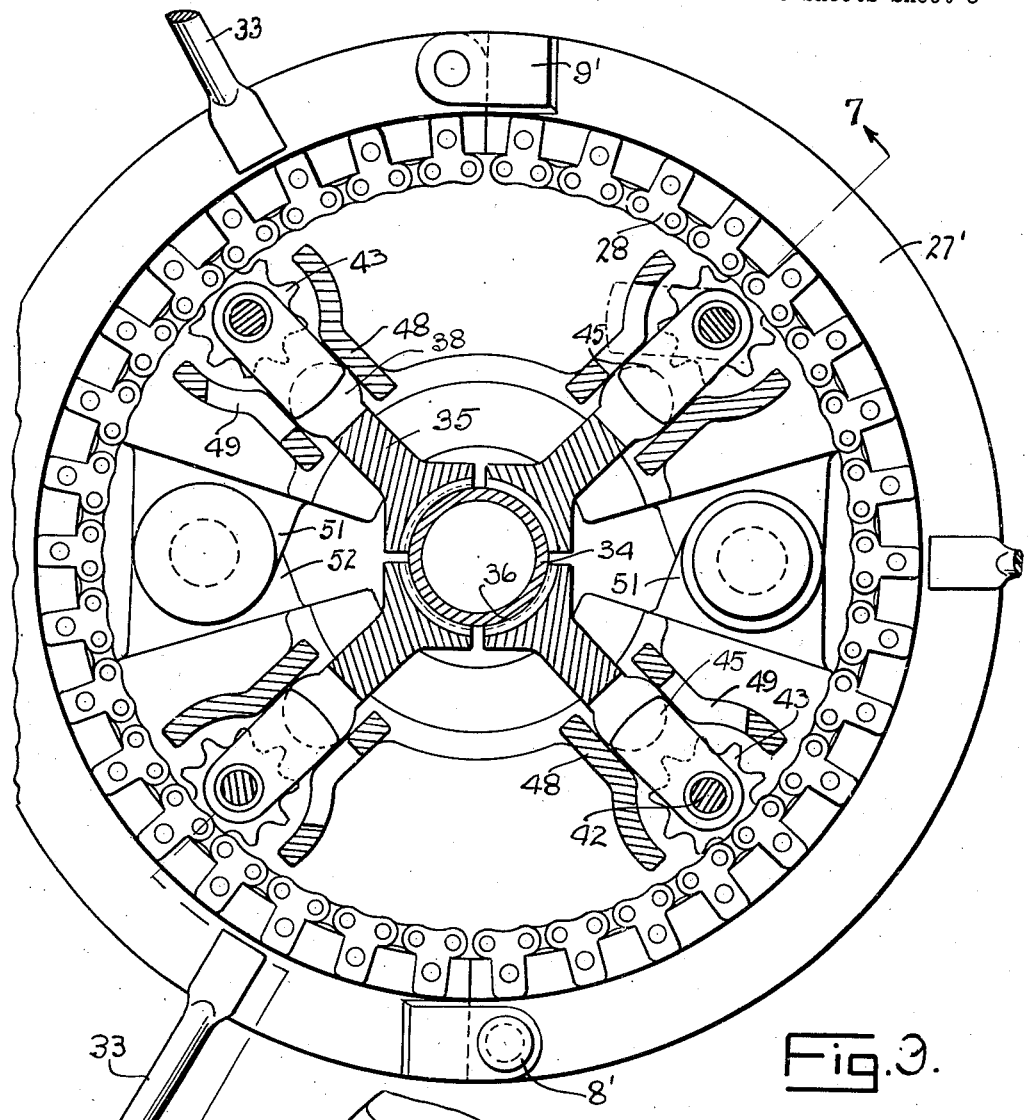
Figure 10:
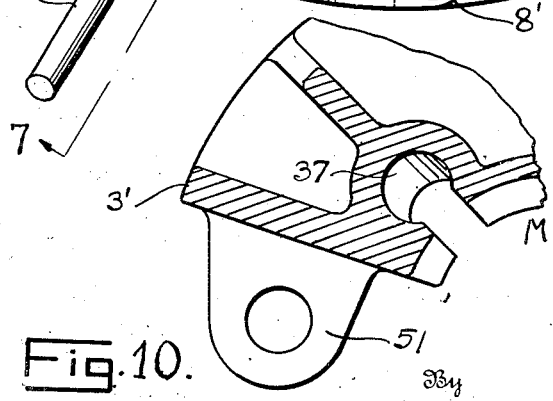
Fig. 10 is a broken detail of the supporting bushing for the slips.

The recess is adapted to receive a tongue or tenon 19 upon inserts or jaws which are slidable therein. I contemplate placing as a lower insert jaw section a gripping member shown in Fig. 6. The tongue 19 thereon extends downwardly along the rearward face of the jaw to a point spaced from the lower end so that when the said tongue engages the lower shoulder 17 on the jaw it will obtain a firm seat therein and the extension 20 below the tongue will fit against the face 21 of the jaw below the recess. The jaw will thus be extended downwardly the full length of the slip but will be firmly supported in its recess. Above this insert I contemplate a plurality of inserts such as shown in Fig. 5 in which the tongue or tenon 19 extends the full length of the insert. When the parts are assembled within the slip it will appear as seen in Fig. 3 with inserts the full length of the slip.

On the outer face of each jaw and along the upper portion thereof I provide a plurality of teeth 22 which are open toward the chamber 11 so as to be engaged by an operating worm gear 23. The teeth 22 are cut on the jaw to engage with the teeth of the gear so that the rotation of said gear may move the slips upwardly or downwardly according to the direction of rotation of the gear. It will be noted that the teeth extend short of the upper end of each slip and also fall short of the lower end thereof.

Each jaw is provided with an operating gear 23 mounted in the lower portion of each of the chambers 11. It is to be understood that the body of the bushing or adapter between the recesses in which the slips are operated is extended upwardly to join with the upper face of the bushing and that the chambers 11 between the upper and lower portions of the circular upper end of the bushing are formed to receive the operating gears 23.

There is a post or shaft 24 upon which each gear is mounted. The said shaft has a bearing in the upper and lower walls of the recess 11. The gear 23 is mounted at the lower end of the shaft and is supported upon a boss 25 at its lower end. Above the gear 23 is a second gear or sprocket 26 fixed upon a hub 27, which bears at its lower end against the upper portion of the lower gear 23 and at its upper end it contacts with the upper wall of the chamber 11.

The gears or sprockets 26 are rotated to operate the gears 23 by means of a ring 27 fitted within the slot 10 and having its interior face shaped to engage the sprocket 26. To make such an engagement a sprocket chain 28 is secured to the inner face of the ring by means of laterally extending ears 29 upon spaced links upon the chain. As shown in Fig. 1, every third link has laterally extending ears 29, which extend above and below the said link and are secured thereto by rivets 30. This ring 27 is split, as is the bushing, and along the same line so as to be removed or inserted without difficulty. It is noted that certain of the links of the chain are left open, as shown at 31, in Fig. 1, so that the ring may be removed when desired. There are three handles 33 upon the ring which allow it to be rotated to operate the gears which in turn control the movement of the slips.

The operation of my device will now be understood. The bushing may be assembled and inserted within the squared opening of the rotary table where it will be maintained against relative rotation. The slips are inserted in position in the recesses 12 of the bushing with the teeth 22 thereon engaging with the worm gears 23. By the rotation of the ring 27 the gears 23 may be operated to raise the jaws to an elevated position thus moved outwardly away from the pipe 34. When it is desired to grip the pipe the rotation of the ring 27 in the proper direction will lower the slips uniformly and it will be seen that each slip will be lowered to the same extent and at the same time as is every other slip and their grip upon the pipe when they have been lowered sufficiently will be uniform on all sides of the pipe. Each jaw being formed with separate inserts may be so concaved on its inner face as to make an accurate fit with the pipe at any point where contact with the pipe is made. As each jaw moves upon its smoothly inclined surface the jaws will not fail to form a smooth and even contact with the pipe and the toothed inner face of each of the inserts will obtain a firm contact with the pipe.

When the slips are to be elevated the rotation of the ring 27 in the opposite direction will move them upwardly with the pipe as the pipe is raised.

My device has the advantage that the jaws may be easily replaced when worn or broken and each individual insert may be replaced when broken or worn without material expense. Further, it will be noted that the jaws are all firmly fixed against any rotative movement relative to the bushing in which they are mounted. There will be no tendency of the slips to rotate with the pipe when screwing up or unscrewing of the pipe is taking place.

In the embodiment disclosed in Figs. 7 to 11, inclusive, I have arranged to operate the slips on substantially the same principle but the mechanism is slightly modified. In this device the bushing 3' is made of somewhat more sturdy construction and the slips 35 while having a dovetailed connection with the bushing are formed with a toothed inner face 36 which is shown as integral with the body of the slip. The connection between the slip and the inner tapered wall of the bushing is a dovetailed one in which the form of the mortise is rounded as shown at 37 in Fig. 12 and the tenon 38 on the slip is rounded to engage therein.

The operating mechanism in this embodiment is mounted within a space or housing between an upper plate or ring 39 and the lower body 40 of the bushing. This upper plate is spaced away from the lower body 40 by means of the upright frame member 41. Between the upper plate and the body of the bushing are mounted rotatable screw shafts 42 toward the lower end of each of which is secured a sprocket or gear 43 similar to the sprockets or gears 26 in the previous embodiment. These gears by their rotation will rotate the screw shafts 42.

Mounted upon the screw shafts 42 are nuts 44, which by the rotation of the shaft will be screwed up and down thereon depending upon the direction of rotation of the shaft. Upon each of these nuts is an inwardly directed finger 45, which is adapted to engage within a horizontally arranged slot or recess 46 in the adjacent slip. As will be noted this slot is of greater width than is the finger 45, so that there will be a slight play of the finger in the slot in the operation of the device, as will be later described.

Figure 12:
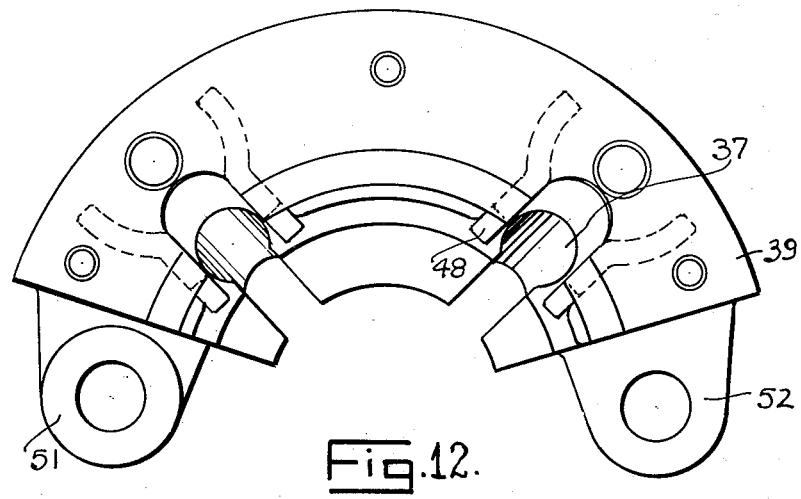
Fig. 12 is a top plan view of the same.
Figure 11:
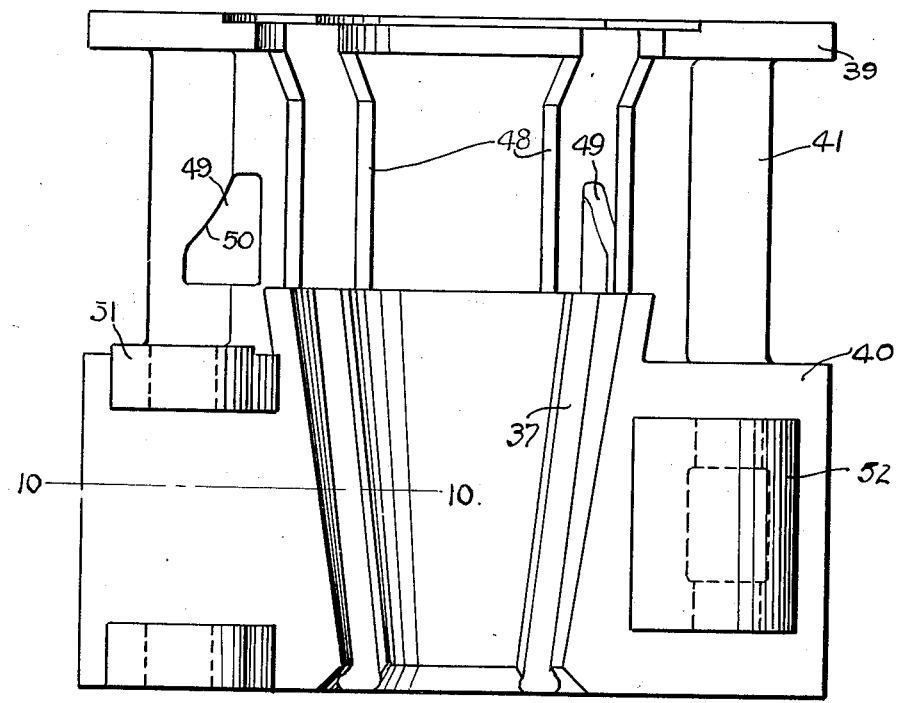
Fig. 11 is an inner side elevation of the bushing.

To hold the fingers aligned horizontally with the slots 46 in the adjacent slips I arrange on the frame of the bushing a pair of spaced guide posts 48 shown best in Figs. 9, 11 and 12. Said plates having their inner portions arranged parallel on each side of the finger 45, so as to contact therewith as will be understood from Fig. 9. Thus, when the shaft is rotated the finger will be held against rotation by contact with the sides of the guide plates 48. Toward the outer portion of each of the plates the web of the plate is rounded outwardly to accommodate the rotating gear or sprocket 43. One of the guide plates 48 has a lateral opening 49 therein, which as seen in Fig. 11 has one corner of the rectangular opening rounded off at 50 to provide a cam surface to be engaged by the finger 45 in the operation of the device. Thus when the slips are being lowered downwardly into pipe engaging position the rotation of the screw shafts 42 will screw the nut 44 or finger 45 downwardly, pushing the slips downwardly therewith. At the point where the slips are forced firmly into the seat and engaging firmly against the pipe the nut 44 will contact with the upper end of the gear or sprocket 43. Also at this point the finger 45 comes opposite the opening 49 in the guide plate. The rotation of the shaft will hence move the finger laterally through the opening 49 in the guide plate and free from engagement with the slips. The slips will thus be free to move upwardly when the pipe is drawn upwardly when the pipe is to be raised, thus preventing damage to the operating mechanism and allowing ready release of the slips from the pipe when the pipe is drawn upwardly.

The gears 43 in this embodiment are operated in substantially the same manner as are the gears in the embodiment first described. The outer ring 27' is provided with handles 33 as in the other embodiment and the said ring is engaged with a hinge 8' on one side and a latch member 9' on the opposite side. The inner portion of the ring is formed with a sprocket chain 28' thereon which is secured to the ring and adapted to engage with the various gears or sprockets.

The construction of the bushing is slightly modified but the bushing is split longitudinally as in the original form. Referring particularly to Figs. 11 and 12, it will be seen that the two halves of the bushing are formed at one end with a pair of spaced lugs 51 through which a pin may be passed. On the opposite side they have a single lug or tenon 52 adapted to engage between the lugs upon the adjacent section and receive a pin to lock the bushing in closed position. In this way the bushing may be placed in position when the pipe is in the hole and readily assembled to receive the slips and operating mechanism.

In this construction and in the previous embodiment the slips are capable of being moved to and from pipe-engaging position uniformly and simultaneously. I am thus assured that the slips will obtain a uniform grip on all sides of the pipe and for a material distance longitudinally of the pipe. In the embodiment last described the slips when moved to their seat are released from the operating mechanism so that they may be moved upwardly out of the seat when the pipe is withdrawn and no danger of injury to the operating mechanism is possible. The slips may be again easily engaged with the fingers of the nuts 44 when they are to be again operated. It is to be noted that when the screw shafts 42 are rotated in a direction to screw the nut upwardly on the shaft, the fingers which are moved laterally into the openings 49 will engage the cam surface 50 on said openings and thus be drawn back into position between the parallel guide plates 48. Thus there will be an automatic movement of the operating fingers 45 into their position to properly engage the slips in the operation of the device. The advantages of this construction will be obvious to those skilled in the art.

What is claim as new is:

1. A pipe engaging device including a bushing shaped to fit within a rotary table, a downwardly tapered circular seat in said bushing, a plurality of spaced-downwardly and inwardly inclined slideways recessed into the seat of said bushing therein, slips having outer inclined faces to fit within said slideways, the inner faces of each of said slips having a single mortised recess open at the top but stopping short of the lower end of said slip, an insert having a tenon thereon engaging within each of said recesses, the forward faces of said inserts being toothed.

2. A pipe engaging device including a bushing shaped to fit within a rotary table, a plurality of spaced-downwardly and inwardly inclined slideways therein, slips having outer inclined faces to fit within said slideways, the inner faces of each of said slips having a mortised recess open at the top but stopping short of the lower end of said slip, inserts having tenons thereon engaging within said recess, the forward faces of said inserts being toothed, the lowermost of said inserts having its toothed face extended downwardly below the lower end of said recess.

3. A pipe engaging device comprising a bushing shaped to fit within a rotary table and including a squared portion to fit said table and a circular upper end overlying said table, downwardly and inwardly inclined slideways spaced around the inner portion of said bushing, slips in said slideways, teeth on the outer faces of said slips, gears in said bushing engaging said teeth and means to rotate said gears to raise or lower said slips simultaneously in said slideways.

4. A pipe engaging device comprising a bushing shaped to fit within a rotary table and including a squared portion to fit said table and a circular upper end overlying said table, downwardly and inwardly inclined slideways spaced around the inner portion of said bushing, slips in said slideways, teeth on the outer faces of said slips, gears in said bushing engaging said teeth and means including a ring rotatable circumferentially about said bushing, to rotate said gears to raise or lower said slips simultaneously in said slideways.

5. In a device of the character described, a support having a polygonal opening, a bushing fitting within said opening, a circular upper end thereon overlying said support, slips in said bushing, teeth on the outer sides of said slips, shafts in said upper end adjacent each of said slips, a gear on each of said shafts operatively engaging said teeth, and means to rotate said shafts to operate said gears for the purpose described.

6. In a device of the character described, a support having a polygonal opening, a bushing fitting within said opening, a circular upper end thereon overlying said support, slips in said bushing, teeth on the outer sides of said slips, a laterally opening chamber in said upper end, a ring extending circumferentially about said upper end within said chamber, gears in said chamber engaging each of said slips and means including said ring to actuate said gears to move said slips.

7. A slip supporting bushing having downwardly converging slideways therein, slips fitting within said slideways, outwardly presented teeth on said slips, worm gears mounted in said bushing and engaging said teeth, and means to rotate said gears simultaneously to move said slips uniformly in either direction.

8. A slip supporting bushing having downwardly converging slideways therein, slips fitting within said slideways, outwardly presented teeth on said slips, worm gears mounted in said bushing and engaging said teeth, and means to rotate said gears simultaneously to move said slips uniformly in either direction, said means including shafts for each of said gears, a sprocket on each shaft, and a sprocket chain movable about said bushing upon said sprocket.

9. A slip-supporting bushing, a plurality of spaced downwardly converging slideways therein, pipe engaging slips in said slideways, a shaft adjacent each of said slips, a worm gear on each shaft operatively engaging the adjacent slip, and means rotatable about said bushing to rotate said shafts and move said slips.

10. A slip-supporting bushing, a plurality of downwardly converging slideways in said bushing, slips in said slideways, means to retain said slips slidably therein, a gear engaging each of said slips and a ring rotatable about said bushing and having an operative engagement with said gears to rotate the same.

11. A slip-supporting bushing, a plurality of slips slidable vertically therein, a gear operatively engaging each of said slips, a ring rotatable about said bushing, and means thereon operatively connected with said gears to rotate the same, said ring being divided diametrically into sections, means securing said sections together, and radial handles on said ring.

12. A slip supporting bushing, a plurality of spaced downwardly converging slideways therein, pipe engaging slips therein, a screw shaft adjacent each of said slips, a nut on each shaft and a finger on said nut engaging the adjacent slip to move said slip to or from pipe-engaging position.

13. A slip supporting bushing, a plurality of spaced downwardly converging slideways therein, pipe engaging slips therein, a screw shaft adjacent each of said slips, a nut on each shaft and a finger on said nut engaging the adjacent slip to move said slip to or from pipe-engaging position, and means to guide said finger and prevent rotation of said nut with said shaft during the upper part of its travel.

14. A slip supporting bushing, a plurality of spaced downwardly converging slideways therein, slips slidable therein to engage or disengage a pipe, a screw shaft adjacent each of said slips, a nut on said shaft, means to normally prevent relative rotation of said nut on said shaft, and means on said nut engaging the adjacent slip to move said slip vertically in said slideways with said nut.

15. A slip supporting bushing, a plurality of spaced downwardly converging slideways therein, slips slidable therein to engage or disengage a pipe, a screw shaft adjacent each of said slips, a nut on said shaft, means to normally prevent relative rotation of said nut on said shaft, a finger on said nut engaging a slot in the adjacent slip to move the slip and means to allow said finger to be released from said slip when said slip has been seated.

16. A slip supporting bushing, a plurality of slips slidable vertically therein, fingers engaging each of said slips, means to move said fingers vertically in uniform relationship, said means adapted to disengage said fingers from said slips when said slips are fully seated.

17. A slip supporting bushing, a plurality of slips slidable vertically therein, screw shafts, nuts thereon, fingers on said nuts engaging each of said slips, guide plates for said fingers, and means to rotate said screw shafts simultaneously.

18. A slip supporting bushing, a plurality of slips slidable vertically therein, screw shafts, nuts thereon, fingers on said nuts engaging each of said slips, guide plates for said fingers, said plates having openings at one side to allow said fingers to be moved laterally away from said slips at the lower end of their travel, and means to rotate said screw shafts simultaneously.

19. A slip supporting bushing, a plurality of slips slidable vertically therein, slip engaging fingers adjacent said slips, means to move said fingers and said slips vertically in uniform arrangement, said means operating to release said slips when the said slips are fully seated in pipe engaging position.

MILTON P. LAURENT.